United States Patent [19]

Yelland

[11] 4,162,249

[45] Jul. 24, 1979

[54] ANTHRANILIC ACID ARYLESTER-AZO-AMINONAPHTHOL SULFONIC ACID DYES

[75] Inventor: Michael Yelland, Manchester, England

[73] Assignee: Imperial Chemical Industries Limited, London, England

[21] Appl. No.: 747,993

[22] Filed: Dec. 6, 1976

[30] Foreign Application Priority Data

Jan. 16, 1976 [GB] United Kingdom ............... 1786/76

[51] Int. Cl.$^2$ ............................................. C09B 29/30
[52] U.S. Cl. ..................................................... 260/199
[58] Field of Search ........................................ 260/199

[56] References Cited

FOREIGN PATENT DOCUMENTS 2130027  12/1972  Fed. Rep. of Germany ........... 260/199

Primary Examiner—Charles F. Warren
Attorney, Agent, or Firm—Cushman, Darby & Cushman

[57] ABSTRACT

Water-soluble monoazo dyes, useful for dyeing polyamide textiles, are obtained by acid coupling aryl esters of anthranilic acid (which may be further substituted in the anthranilic ring) with 2-amino-8-naphthol-6-sulphonic acid.

1 Claim, No Drawings

ANTHRANILIC ACID ARYLESTER-AZO-AMINONAPHTHOL SULFONIC ACID DYES

This invention relates to monoazo dyes and their application to textile materials.

According to the invention, there are provided water-soluble monoazo dyes which, in the form of the free acids, have the formula:

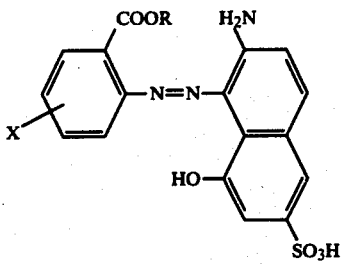

wherein R represents an optionally substituted aryl radical and X represents hydrogen, halogen, nitro or acetylamino.

Halogen atoms which may be represented by X include chlorine and bromine.

Optionally substituted aryl radicals which may be represented by R include α-naphthyl, β-napthyl and radicals of the formula:

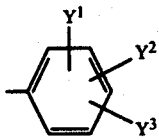

wherein $Y^1$, $Y^2$ and $Y^3$ each independently represents hydrogen, halogen, hydroxy, amino, nitro, acetylamino, alkyl, alkoxy, alkoxycarbonyl, cycloalkyl or aryl. Alkyl radicals which may be represented by $Y^1$, $Y^2$ and $Y^3$ particularly include those containing from 1 to 9 carbon atoms. Particularly important are radicals of the formula:

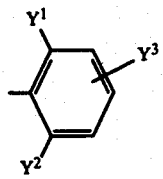

wherein $Y^3$=H and $Y^1$ and $Y^2$ are independently methyl, ethyl or halogen. Dyes containing such radicals are distinguished by their brightness of shade, high light fastness and excellent thermal stability. They are also capable of giving consistent dyeing results from dyebaths containing auxiliary retarding agents as commonly used in the colouration of polyamide carpets.

The dyes of the invention may be prepared by diazotising an amine of the formula:

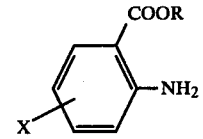

wherein R and X have the meanings given above, and coupling the resulting diazo compound with 2-amino-8-naphthol-6-sulphonic acid under acid conditions.

Amines of Formula I may be prepared by reacting the appropriate isatoic anhydride with the appropriate phenol as described in U.S. Pat. No. 3,123,631.

A further method of preparing the amines of Formula I is to react an o-nitrobenzoyl chloride with a phenol followed by reduction of the nitro group.

The reactions leading to the formation of the dyes of the invention may be performed using conditions that have been fully described in the prior art. Similarly, the dyes may be isolated by known methods and as in the case of other dyes containing sulphonic acid groups it is often convenient to isolate and use the dyes in the form of their water-soluble salts, particularly their alkali metal or ammonium salts and especially sodium salts. It is to be understood that the invention relates to both the free acids and their salts.

The dyes of the invention, singly or in the form of mixtures, are particularly suitable for applying to polyamide textile materials, for example nylon 66, nylon 6 and nylon 11, using any of the general methods known for the application of acid dyes to such materials. Red shades may be obtained having a high degree of fastness to wet treatments and to light. As noted above, certain of the dyes have excellent thermal stability. This is important in dyes used for the dyeing of nylon carpets which are subsequently to be given a hot latex backing. In order to withstand this treatment, the dyed nylon material should show no loss in depth or colour when treated at 180° C. for 2 minutes.

The invention is illustrated but not limited by the following Examples in which all parts are by weight.

EXAMPLE 1

A mixture of 81.5 parts of isatoic anhydride, 61 parts of 2,6-dimethylphenol and 2.5 parts of sodium hydroxide in 250 parts of dioxan is heated at 70°–75° C. for six hours. Residual sodium hydroxide is screened off and the reaction mixture is poured into 1000 parts of ice cold water. The mixture is stirred for 1 hour and the precipitate of 2',6'-dimethylphenylanthranilate is filtered off, washed with water and dried.

24.1 parts of 2',6'-dimethylphenylanthranilate are suspended in a mixture of 120 parts of ice/water and 40 parts of 35.5% hydrochloric acid. A solution of 6.9 parts of sodium nitrate in 40 parts of water is added dropwise to the mixture at 0°–5° C. which is then stirred for 3 hours at 0°–5° C. Residual nitrous acid is destroyed by the addition of a 10% solution of sulphamic acid. The diazo suspension is added dropwise to a suspension of 24.5 parts of 2-amino-8-naphthol-6-sulphonic acid in 500 parts of ice/water maintaining the pH during the addition at 3–3.5 by the addition of a saturated solution of sodium acetate. When the coupling is complete, the product is filtered off. The filter cake is resuspended in 1000 parts of water and the suspension is adjusted to pH 7 by the addition of sodium carbonate solution. The mixture is heated to 40°–45° C. and sodium chloride is added to a concentration of 1%. The product is filtered off and dried.

The product dyes polyamide materials in bright bluish-red shades with high light fastness and excellent thermal stability.

EXAMPLE 2

A mixture of 16.8 parts of isatoic anhydride, 24.4 parts of 2,6-dimethylphenol and 0.1 parts of sodium hydroxide is heated at 50°–55° C. for one hour. 100 Parts of water at 50° C. are added to the reaction mixture and the mixture is stirred at 50° C. for 15 minutes. The precipitated solid is filtered off and washed with water. The filter cake is suspended in 400 parts of ice-/water and 20 parts of 32% sodium hydroxide solution are added. After stirring for 5 minutes the product is filtered off, washed with water and dried. The product is identical to the 2′,6′-dimethylphenyl anthranilate prepared as in Example 1 and when diazotised and coupled with 2-amino-8-naphthol-6-sulphonic acid as described in Example 1 a product identical in properties to that described in Example 1 is obtained.

EXAMPLE 3

A mixture of 20 parts of isatoic anhydride, 13.5 parts of resorcinol, 1 part of sodium hydroxide and 50 parts of dioxan is stirred at 50° C. for 18 hours. Residual sodium hydroxide is screened off and the filtrate is added to 200 parts of water with stirring. A pale brown precipitate of 3′-hydroxyphenylanthranilate is formed which is filtered off, washed with water and dried. The product is recrystallised from aqueous dioxan.

2.21 Parts of the 3′-hydroxyphenylanthranilate are diazotised in dilute hydrochloric acid and coupled at pH 3.5 with 2.87 parts of 2-amino-8-naphthol-6-sulphonic acid. A dyestuff is obtained which dyes polyamide materials in bluish-red shades possessing excellent fastness to washing, perspiration, and to light.

EXAMPLE 4

A mixture of 19.2 parts of isatoic anhydride, 13.8 parts of cresylic acid (a mixture of phenols of which the main constituent is m-cresol), 0.5 parts of sodium hydroxide and 50 parts of dioxan are heated at 45°–50° C. for 4 hours. Residual sodium hydroxide is screened off and 500 parts of water are added to the filtrates. The brown oil which is formed is extracted into ether and the ether extract is washed three times with water. The ether solution is dried over magnesium sulphate and the ether is then distilled off leaving the cresylic acid ester of anthranilic acid as a brown oil.

When the ester is diazotised in dilute hydrochloric acid and coupled at pH 3 with 2-amino-8-naphthol-6-sulphonic acid, a dyestuff is obtained which dyes polyamide materials in bluish-red shades possessing excellent fastness to washing, light and heat treatments.

Further Examples of dyes of the invention, made as described in the foregoing Examples, are given in the following Table in which the first column identifies X giving the position of substituents relative to the azo group, the second column identifies R and the third column gives the shade of the dye.

Table

| Example | X | R | Shade |
|---|---|---|---|
| 5 | H |  | Bluish-red |
| 6 | H | 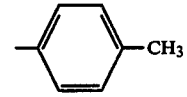 | " |
| 7 | H | 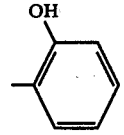 | " |
| 8 | H | 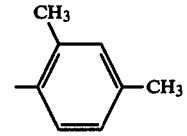 | " |
| 9 | H | 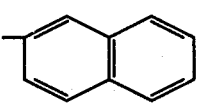 | " |
| 10 | H | 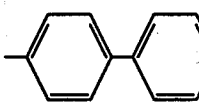 | " |
| 11 | H | 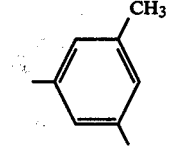 | " |
| 12 | H | 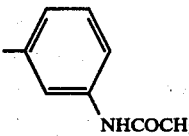 | " |
| 13 | H | 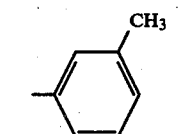 | " |
| 14 | H | 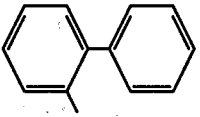 | " |
| 15 | H | 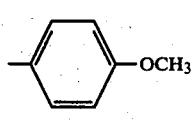 | " |
| 16 | p—NO$_2$ | 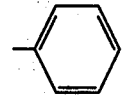 | Navy-blue |

Table-continued
| Example | X | R | Shade |
|---|---|---|---|
| 17 | p—NO$_2$ | 2,6-dimethylphenyl | " |
| 18 | p—CH$_3$CONH— | phenyl | Red |
| 19 | p—CH$_3$CONH— | 4-methylphenyl | " |
| 20 | H | 4-chlorophenyl | Bluish-red |
| 21 | H | 4-cyclohexylphenyl | " |
| 22 | H | 2-cyclohexylphenyl | " |
I claim:
1. A water soluble monoazo dye which, in the form of the free acid, has the formula:
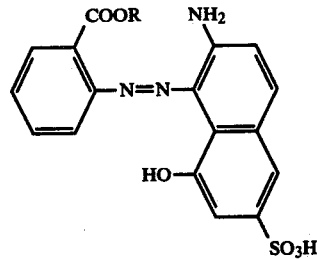
wherein R represents a radical of the formula:
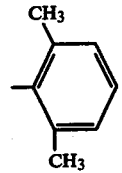
* * * * *